United States Patent
Morovic et al.

(10) Patent No.: US 10,694,075 B2
(45) Date of Patent: Jun. 23, 2020

(54) COLOR MAPPING RESOURCES DETERMINING CHARACTERISTIC OF PRINT COVERAGE VECTORS IN COLORIMETRY PARTITIONS

(71) Applicant: HEWLETT-PACKARD DEVELOPMENT COMPANY, L.P., Spring, TX (US)

(72) Inventors: Jan Morovic, London (GB); Peter Morovic, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/476,494

(22) PCT Filed: Apr. 21, 2017

(86) PCT No.: PCT/US2017/028790
§ 371 (c)(1),
(2) Date: Jul. 8, 2019

(87) PCT Pub. No.: WO2018/194643
PCT Pub. Date: Oct. 25, 2018

(65) Prior Publication Data
US 2020/0059572 A1 Feb. 20, 2020

(51) Int. Cl.
*H04N 1/60* (2006.01)

(52) U.S. Cl.
CPC ............ *H04N 1/60* (2013.01); *H04N 1/6016* (2013.01); *H04N 1/6058* (2013.01)

(58) Field of Classification Search
None
See application file for complete search history.

(56) References Cited

U.S. PATENT DOCUMENTS

| | | | |
|---|---|---|---|
| 7,710,597 B2 | 5/2010 | Edge | |
| 10,171,706 B2 * | 1/2019 | Morovic | H04N 1/6016 |
| 2007/0273900 A1 | 11/2007 | Bai | |
| 2013/0021631 A1 | 1/2013 | Nachlieli et al. | |
| 2016/0080608 A1 | 3/2016 | Morovic et al. | |
| 2016/0080612 A1 | 3/2016 | Martinez de Salinas Vazquez et al. | |

(Continued)

OTHER PUBLICATIONS

Deshpande, K. et al., Characterisation of the N-colour Printing Process Using the Spot Colour Overprint Model, Dec. 16, 2014 (15 pages).

*Primary Examiner* — Scott A Rogers
(74) *Attorney, Agent, or Firm* — HP Inc. Patent Department

(57) ABSTRACT

In an example, a method includes determining a plurality of print coverage vectors, each of the print coverage vectors specifying a common amount of a selected print agent. The method may further comprise determining a colorimetry provided by each of the print coverage vectors and dividing a range of colorimetries into partitions in a colorimetric space. For each of a plurality of the partitions, the method may include determining a characteristic of each print coverage vector resulting in a colorimetry within that partition and selecting a print coverage vector for that partition based on the determination. A color mapping resource may be determined based on the selected print coverage vectors.

15 Claims, 4 Drawing Sheets

(56) References Cited

U.S. PATENT DOCUMENTS

2017/0048420 A1    2/2017   Morovic
2019/0281191 A1*   9/2019   Morovic .................. H04N 1/00

* cited by examiner

COLOR MAPPING RESOURCES DETERMINING CHARACTERISTIC OF PRINT COVERAGE VECTORS IN COLORIMETRY PARTITIONS

BACKGROUND

Printing systems may convert input data (for example, data representing an image for two-dimensional printing, or data representing an object for three dimensional printing) to print instructions, which specify where print materials (for example, colorants such as inks or toners or other printable materials) are to be placed in a print operation.

BRIEF DESCRIPTION OF DRAWINGS

For a more complete understanding, reference is now made to the following description taken in conjunction with the accompanying drawings in which.

DETAILED DESCRIPTION

Figure 1:
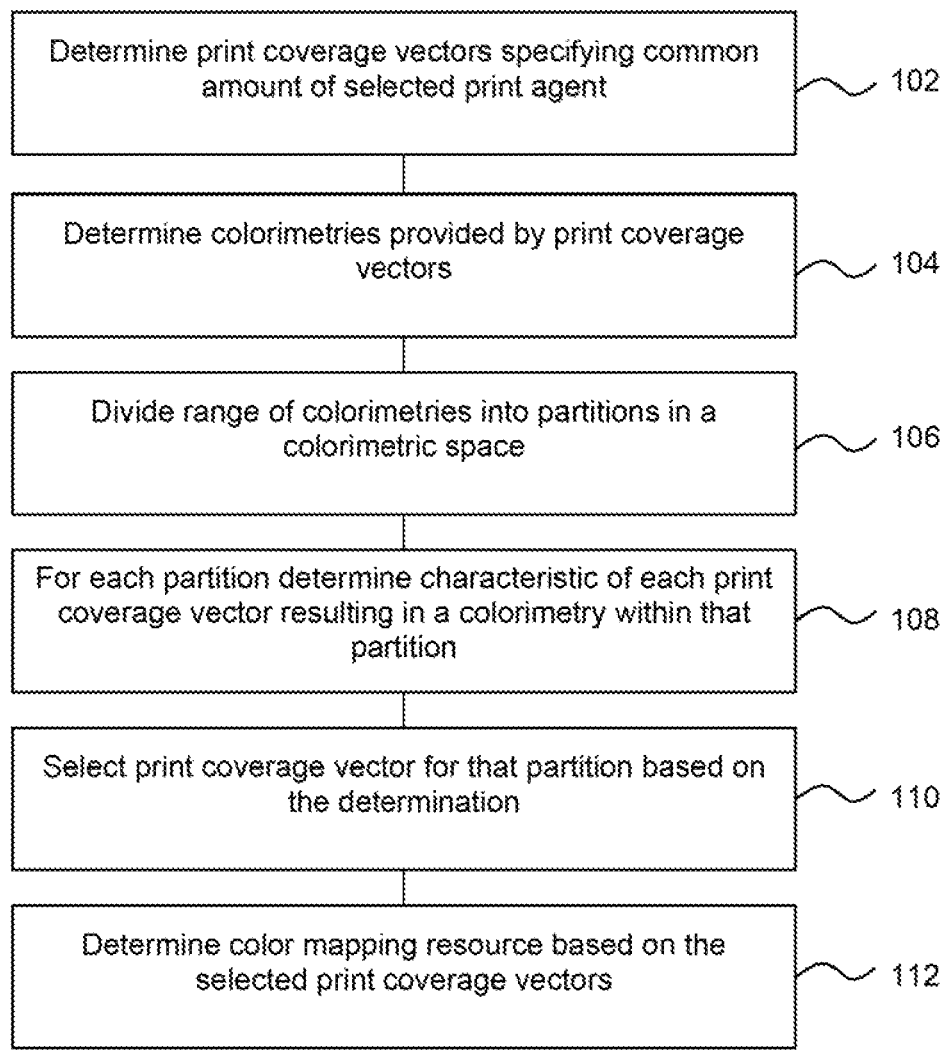
FIGS. 1 and 2 are example methods of determining a color mapping, resource.

In the case of two-dimensional printing, a print addressable location may be represented by at least one pixel, and each print addressable location may be printed with at least one colorant such as inks (for example cyan, magenta, yellow and black inks), coatings or other print materials, as well as combinations of those print materials.

In the case of three-dimensional printing, which is also referred to as additive manufacturing, three-dimensional space may be characterised in terms of 'voxels', i.e. three-dimensional pixels, wherein each voxel occupies or represents a discrete volume. In examples of three-dimensional printing therefore, an addressable area may correspond to at least one voxel and each voxel may be 'printed' i.e. generated or manufactured, using one or a combination of agents and/or build materials.

To briefly discuss three-dimensional printing in greater detail, objects generated by an additive manufacturing process may be formed in a layer-by-layer manner. In one example, an object is generated by solidifying portions of layers of build material. In examples, the build material may be in the form of a powder or powder-like material, a fluid or a sheet material. In some examples, the intended solidification and/or physical properties may be achieved by printing an agent onto a layer of the build material. Energy may be applied to the layer and the build material on which an agent has been applied may coalesce and solidify upon cooling. In other examples, directed energy may be used to selectively cause coalescence of build material, or chemical binding agents may be used to solidify a build material. In other examples, three-dimensional objects may be generated by using extruded plastics or sprayed materials as build materials, which solidify to form an object.

Some processes that generate three-dimensional objects use control data or print instructions generated from a model of a three-dimensional object. This control data may, for example, specify the locations at which to, apply an agent to the build material, or where a build material itself may be placed, and the amounts to be placed. The control data may be generated from a 3D representation of an object to be printed. Locations may be expressed in terms of voxels. A voxel at a given location may have at least one characteristic. For example, it may be empty, may have a particular color or may represent a particular material, or a particular object property, or the like. In general, the voxels of an object may each have the same shape (for example, cubic or tetrahedral), or may differ in shape and/or size. However, where the term voxel is used herein to refer to a print addressable location, the voxel size may be determined at the print resolution of a print apparatus, i.e. it may correspond to a volume which can be individually addressed by a print apparatus (which may be a particular print apparatus, of a class of print apparatus, or the like) such that the properties thereof can be determined at least substantially independently of the properties of other voxels.

It may be that possible print materials to be applied to an addressable location are specified within an element set. In some examples, the print materials may be identified explicitly, i.e. in a set of elements comprising a set of print materials and/or print material combinations. In other examples, it may be that at least one of the elements of an element set relates to other qualities, which may, in turn be related to print materials. For example, an element may specify a property or the like which can be mapped to print materials. In another example, a color may be specified in terms of a Neugebauer Primary (a set of the colors (and in some examples, the number of drops of printing agent) which can be applied by a particular print apparatus), which in turn may have predetermined mappings to colorants.

In some examples, a set of elements is expressed as a print material coverage representation which defines print material data, for example detailing (explicitly or implicitly, for example via a mapping) the amount of print materials (such as a colorant or coating dimensional printing or an agent(s) to be deposited onto a layer of build material, or in some examples, build materials themselves for three dimensional printing), and, if applicable, their combinations. Such print materials may be related to or selected to provide an image or object property such as, for example, color, transparency, flexibility, elasticity, rigidity, surface roughness, porosity, conductivity, inter-layer strength, density, and the like.

For example, a print addressable location within input data (for example, a pixel in image data or a voxel in object model data) may be associated with one or a set of print material coverage representations. In the case of two-dimensional printing, these may be referred to as area coverage vectors. For example, the vectors may comprise ink vectors, which specify proportions of inks to be applied (and may therefore be thought of as native to a printer), or print agent vectors, which specify proportions of print agents (which may include inks and/or other print agents) to be applied and/or Neugebauer Primary Area Coverage vectors (NPac vectors, or simply NPacs), which may specify colors in a manner which may be associated with inks or other colorants and their combinations. By analogy, in three-dimensional printing, print agent vectors, which specify proportions of print agents to be applied and/or Material Volume coverage vectors (termed Mvoc vectors, or simply MVocs, herein), which may also specify combinations of print agents, may be defined. Such area or volume coverage vectors (referred to as print coverage vectors collectively herein) may provide a probability that a print material or a combination of print materials may be applied in a location. In a simple case, such a vector may indicate that X % of a given region should have a particular print material or print material combination applied thereto, whereas (100-X) % should be left clear of the print material. In practise, this may be resolved at the addressable resolution for the print material and/or printing device. Therefore, if there are N×M addressable locations in an XY plane associated with such a vector, X % of these locations may receive a print material, while (100-X) % do not.

Such a print coverage vector may provide a plurality of values, wherein each value defines a probability for each print material, or each combination of print materials described. For example, in a printing system with two available print materials (for example, inks, coatings or agents)—M1 and M2, where each print material may be independently deposited in an addressable area (e.g. voxel or pixel), there may be $2^2$ (i.e. four) probabilities in a given Mvoc or NPac coverage vector: a first probability for M1 without M2; a second probability for M2 without M1; a third probability for an over-deposit (i.e. a combination) of M1 and M2, e.g. M2 deposited over M1 or vice versa; and a fourth probability for an absence of both M1 and M2. In this example, it is assumed that a drop of print material may be applied or not: i.e. a binary choice may be made and the value for each agent may be either 0 or 1, In this case, a print coverage vector may be: [M1, M2, M1M2, Z] or with example probabilities [M1:0.2, M2:0.2, M1M2:0.5, Z:0.1]—in a set of print addressable locations (e.g. and [x,y] or an [x, y, z] location (which in some examples may be a [x,y] location in a z slice)) to which the coverage vector applies, 20% of locations are to receive M1 without M2, 20% are to receive M2 without M1, 50% are to receive M1 and M2 and 10% are to be left clear (Z). In non-binary systems, there may be more elements defined describing the different amounts of print agent and/or associated combinations of print agents, which may be applied. As each value is a proportion and the set of values represent the available material combinations, the set of values in each print coverage vector generally sum to 1 or 100%.

In another example of print coverage vector in which the area/volume coverage is controlled but the 'at pixel' or 'at voxel' choices are not ("print agent vectors" herein: i.e. print coverage vector may specify that X % of a region receives agent M1 and Y % receives agent M2, but the overprinting of agents is not explicitly defined (although the sum of X and Y may be greater than 100, so overprinting may result).

Print coverage vectors may therefore specify a plurality of elements which are related to print materials, and a probability for each element. Determining mappings from color space into the print coverage vectors can present a processing challenge, a fill set of mappings may consume significant processing resources and large amounts of memory to store.

FIG. 1 is an example of a method, which may be a computer implemented method of determining a color mapping resource.

The method comprises, in block 102, determining a plurality of print coverage vectors, each of the vectors specifying a common (i.e. the same) amount of a selected print agent. For example, the print agent vectors may specify a probability of printing a particular color or combination of colors from a print agent set comprising Cyan, Magenta, Yellow and Black print agents (a CMYK color set). These may be specified as an NPac or Mvoc, for example comprising individual colors and combinations of colors or as a print agent vector. If the common amount is specified for black, then this amount may be seen in all vectors. In some examples, the print coverage vectors may be determined randomly, in some cases with print agent limits (i.e. the maximum number of drops which may be applied to a print addressable location). In other examples, the print coverage vectors be determined or selected in some other way.

For example, a set of 'ink' print agent vectors may include [C: 25%, M: 25%, Y: 25%, K: 25%] and [C: 15%, M: 25%, Y: 35%, 25%]: the K amount is the same in both. A set of NPacs or Mvocs may include [K=3%, CK=2%, M=30%, Z=65%] and [K=1%, CK=3%, MK=1%, M: 25%, Z=70%] (where Z indicates that a location is left clear of print agent): in both examples, black print agent will, be applied to 5% of voxels. A particular example where the common amount is 0% is discussed below.

In some examples, the common amount of print agent may be a range. For example, there may be 5 ranges considered, for example dividing the space addressable by print agents into 20% ranges. In such examples, the size of each range may be selected based on an intended level of granular control of the color output.

While any print agent may be selected as the print agent for which a common amount is specified, black may be chosen as this may have greater impact on print quality issues and on print agent use. Moreover, in considering color spaces, black may regularly be used as the basic color around which a color, space is constructed. This may be because black is often used for printing text and lines.

Block 104 comprises determining colorimetries provided by the print coverage vectors. Thus, for example, the colorimetry of a plurality of coverage vectors specifying X % coverage for the selected print agent and varying amounts for other print agents may be determined. The colorimetry of a coverage vector may for example be modelled or predicted, for example by simulating an image printed using the print coverage vector, or based on test data from previously printed samples produced using the print agents in the proportions specified in the print coverage vector.

The colorimetry may be expressed in any color space, and may in some examples be color space which is independent of any print apparatus. For example, the device independent color space may be sRGB, Adobe RGB, or may be some other color space, for example a color space which uses an International Commission on Illumination (CIE) color model. Other color space models include Hue-Saturation-Value (HSV), Hue-Saturation-Lightness (HSL), Yule-Nielsen-corrected XYZ, XYZ, LAB or the like.

Block 106 comprises dividing a range of colorimetries into partitions in a colorimetric space. For example, this may be specified in terms of color difference, such that, for examples, greens with a first hue range are in a first partition and greens with a second hue range are in a second partition. For example, the partitions may be characterised by a ΔC amount in the RGB color space or a ΔE value in an International Commission on Illumination (CIE) color model space. In some examples, all the partitions may be of the same size and the size of the partitions may be determined based on the amount of granular control intended for the mapping resource, with smaller partitions allowing more precise control of colors via the color mapping resource being developed in the method. In some examples, the available processing resources may be considered as more partitions will generally suggest greater use processing resources such as processing time, power and storage capacity. In some examples, the partitions for an entire, or for substantially an entire, color space may be defined prior to considering the colorimetries, and the vectors may be associated with a predefined partition. In other examples, partitions may be defined for just those regions of color space which are provided by the set of vectors, i.e. the range of colorimetries may be the range exhibited by the print coverage vectors.

Block 108 comprises, for each of a plurality of the partitions, determining a characteristic of each print coverage vector resulting in a colorimetry within that partition. For example, the characteristic may be a predicted print characteristic such as print agent use, grain, robustness (i.e. repeatability/consistency). In some examples, a plurality of such characteristics may be considered, in some examples with a priority order. The characteristic(s) may for example be modelled or predicted, for example by simulating an image printed using the print coverage vector. This may comprise subjecting a vector to a halftoning process and generating a simulation of a printed result, which may also include a modelling of any perturbation which may result in the printing. In other examples, the characteristic(s) may be determined based on test data from previously printed samples produced using the print agents in the proportions set out in the print coverage vector. It may be noted that not all partitions may be 'occupied' by a vector. However, in other examples, there may more than one vector which results in a colorimetry which falls inside a particular partition.

Block 110 comprises selecting a print coverage vector for that partition based on the determination. In some examples, one of a plurality of vectors which is associated with generally more favourable characteristic(s) (e.g. lower print agent usage, lower grain, greater robustness or the like) may be selected. Where there is a single vector in a partition, this may be selected automatically without a determination of characteristics being made.

Block 112 comprises determining a color mapping resource based on the selected print coverage vectors. For example, these may be placed in a lookup table associating the vectors with a colorimetry. In some examples, as set out below, additional processing is carried out prior to forming the color mapping resource. The color mapping resource may for example be for use by a print apparatus, or in generating control data.

The result of the process of blocks 102 to 110 is a set of selected vectors, which may be a set of the selected vectors which may have particular qualities and providing a particular colorimetry, and which have a common level of a print agent. For example, this may represent print vectors which map into a color gamut associated with the level of print agent—for example, the color gamut accessible for vectors having 5% black ink, or between 0 and 20% black ink, or the like.

This process may be repeated for each of a series of different amounts of the selected print agent. Thus the gamut available for black levels being 0%, 5%, 10%, 15%, 20%, 25% and so on up to 100% may be mapped in turn. As in this example, discrete and separated amounts may be considered. The spacing between the amounts may be selected based on an intended granularity of color control, with granularity increasing as the difference between the levels decreases, and/or on based on the capabilities of the processing resources available. In other examples, as noted above the common amount may be a common range, and the process of blocks 102-110 may be completed for a different range. For example, a first range may consider vectors having between 0 and 20% of the selected print agent and the second range may consider vectors having greater than 20% and less than or equal to 40% of the print agent. Within each range, it may be that discrete black levels, for example in levels of, say 1%, 2%, 5%, 10% or the like may be considered.

Figure 2:
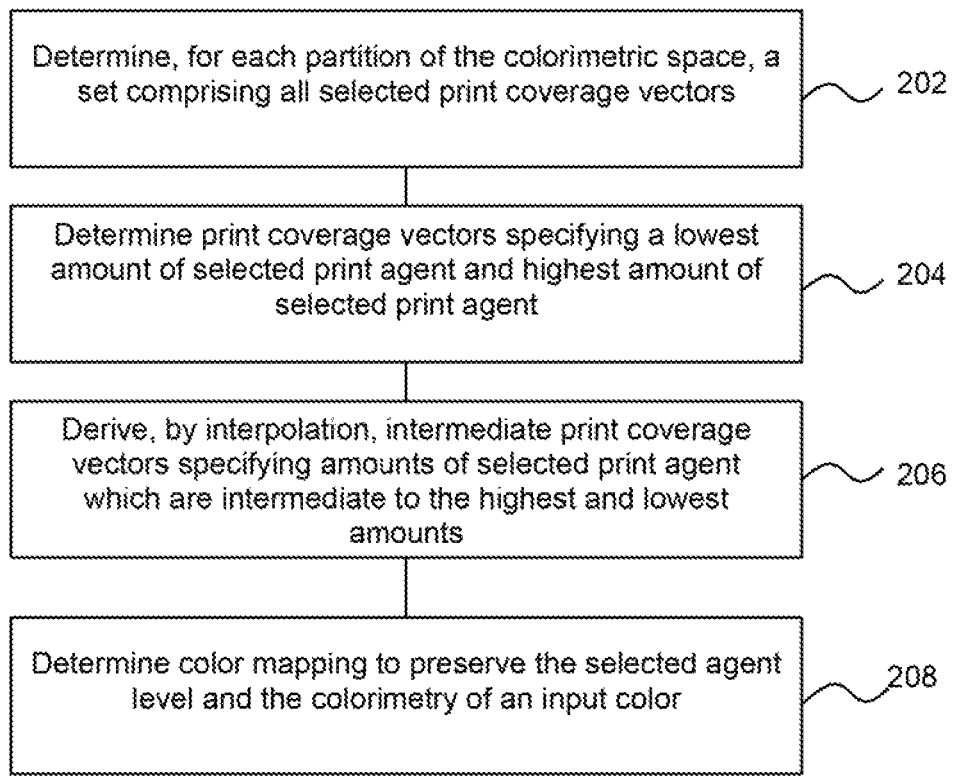

FIG. 2 shows an example of a method, which may be a method of carrying out block 112 of FIG. 1, wherein the method of blocks 102-110 has been iterated for each of plurality of different amounts of the selected print agent.

Block 202 comprises determining, for each partition of the calorimetric space, a set comprising all selected print coverage vectors. Note, this set may include vectors with differing levels of the selected print agent which result in a colorimetry lying in the same partition.

Block 204 comprises determining print coverage vectors specifying a lowest amount of the selected print agent and the highest amount of the selected print agent within each partition.

In a first example, block 204 may comprise identifying the print coverage vectors from the set of print coverage vectors identified in block 202. In other examples, block 204 may comprise interpolating new print coverage vectors from the set of print coverage vectors. For example, the interpolation may extend a trend based on the available vectors in that partition to estimate the content of a print coverage vector having the highest amount of the selected print agent for that partition.

Block 206 comprises deriving, by interpolation, intermediate print coverage vectors specifying amounts of the selected print agent which are intermediate to the highest and lowest amounts.

Block 208 comprises determining a color mapping, wherein the mapping is to preserve the selected agent level and the colorimetry of an input color. The mapping may be between a color space of a predetermined print agent set and a plurality of print coverage vectors. This may comprise consideration of an intermediate mapping between color space of a predetermined print agent set color space and the color space in which the colorimetry was determined. The predetermined print agent set may be a CMYK set and the selected print agent may be black, or K.

The mapping resource may effectively be arranged as a plurality of K levels where for each K level there is a CMY mapping in to a partitioned calorimetric space.

In other words, the print coverage vectors determined may be used to form a CMY to print coverage vector mapping resource based on the print coverage vector for a black level. It may be noted that the CMY and RGB color spaces are related (CMY being a 1-RGB (or 255-RGB for an 8-bit encoding)).

This provides a CMYK to print coverage vector mapping resource, where K ink use is proportional to K channel inputs. This means that, for a variety of CMYK values being processed through such a mapping, the amount of K ink will be proportional to values of K only (i.e., it is only the K value that impacts K ink use and not also the CMY values in a CMYK input). In other words, the result is a mapping where the K channel controls the amount of K print and where the CMY channels together control the amount of the non-K inks (e.g., CMY, or RGB or other inks like orange and violet). The constraint applied in generating the mapping (in that it honours the K amount) is offset somewhat as it does not honour the specific CMY amounts. This results in a mapping resource which does not overly constrain itself while obtaining a reasonable level of optimisation. Moreover, it may be tailored to the processing resources and/or the level of granular control intended.

To consider a particular example in which a print agent is selected for each of a plurality of ranges covering 20% coverage of the selected print agent (which in this example is black, or K), there may be three selected vectors determined in block 202 which map to a particular partition:

| Selected K interval | Occupied | K amount | Vector |
|---|---|---|---|
| 1 [≥0, ≤20] | Y | 5% | [K = 3%, CK = 2%, M = 30%, Z = 65%] |
| 2 [>20, ≤40] | Y | 30% | [CK = 10%, MK = 20%, M = 40%, Z = 30%] |
| 3 [>40, ≤60] | N | | |
| 4 [>60, ≤80] | Y | 70% | [K = 15%, CK = 20%, MK = 35%, M = 30%] |
| 5 [>80, ≤100] | N | | |

Block 204 may comprise selecting the vectors having highest and the lowest K amounts (in this example, the vectors at 1 and 4 comprising 70% and 5% K amount respectively), and block 206 comprises interpolating the intermediate values, for example using linear interpolation as shown to provide a K level of 20 and 40 below:

| K level | Interpolation | Weights | Vector |
|---|---|---|---|
| 0 | N | | [K = 3%, CK = 2%, M = 30%, Z = 65%] |
| 20 | Interpolation of 1 and 2 | (20 − 5)/25 = 0.4 of 1<br>(30 − 20)/25 = 0.6 of 2 | [K = 0.6 * 3 = 1.8%, CK = 0.6 * 2 + 0.4 * 10 = 5.2%,<br>MK = 0.4 * 20 = 8%, M = 0.6 * 30 + 0.4 * 40 = 34%,<br>Z = 0.6 * 65 + 0.4 * 30 = 51%] |
| 40 | Interpolation of 2 and 4 | (40 − 30)/40 = 0.25 of 2<br>(70 − 40)/40 = 0.75 of 4 | [CK = 10 * 0.25 + 20 * 0.75 = 17.5%,<br>K = 15 * 0.75 = 11.25%,<br>MK = 20 * 0.25 + 35 * 0.75 = 31.25%,<br>M = 40 * 0.25 + 30 * 0.75 = 32.5%,<br>Z = 30 * 0.25 = 7.5%] |
| 60 | N | | [K = 15%, CK = 20%, MK = 35%, M = 30%] |
| 80 | N | | |

It may, be noted that the vectors corresponding to the highest and lowest amounts of black are maintained. Those relating to intermediate amounts are interpolated from the original vectors based on their relative spacing. In this example a K level has been associated with each range and the distance of a particular K level in a vector from that K level is used to determine the proportion of the contribution of that vector to the interpolated vector (providing the numerator, where the denominator comprises the sum of the numerators for all vectors contributing to an interpolation).

In this example, there is no interpolation outside of the ranges for which a vector has been identified. In other examples, however, vectors associated with the highest and lowest amounts may be derived through interpolation, resulting in a complete mapping between the partition and the ranges of the print agent amounts.

As has been mentioned above, in one example, the common amount of the selected print agent may be zero, and the print coverage vectors are generated so as to result in a total coverage having a value that is less than 100%.

For example, the print coverage vectors are generated so as to result in a total coverage of 95%. This reserves a 5% coverage for the selected print amount. The method may be iterated over different total area coverages, each making a reservation of a different coverage amount (or range) for the selected print agent.

Such methods may proceed much as is set out above, identifying a vector for each of a plurality of total coverage levels for a particular partition, and in some example interpolating additional vectors. Determining the color mapping resource in block 108 in such examples may further comprise adding, to each selected print coverage vector, an element for the selected print agent comprising a coverage relating to the selected print agent, where the coverage specified for the selected print agent difference between the total coverage for that print coverage vector and 100%.

Figure 3:
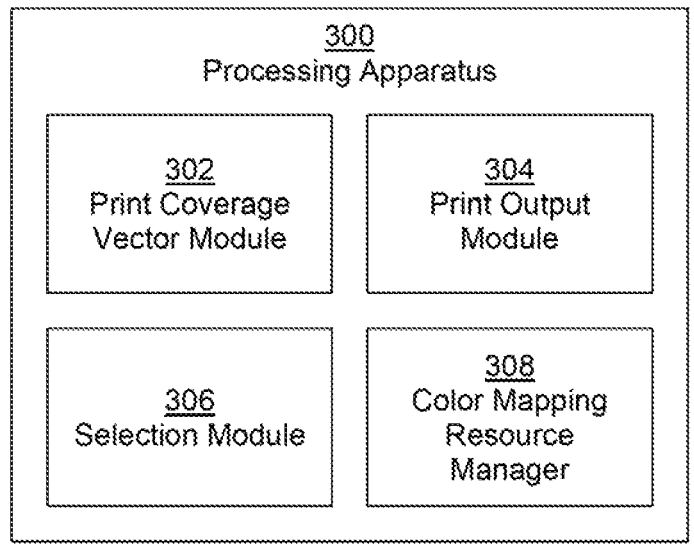
FIGS. 3 and 4 are examples of processing circuitry.

FIG. 3 is an example of processing circuitry 300 comprising a print coverage vector module 302, a print output module 304, a selection module 306 and a color mapping resource manager 308.

In use of the processing circuitry 300, the print coverage vector module 302 determines a plurality of print coverage vectors, each of the vectors specifying a common amount of a selected print agent. This may be a single amount or may comprise a range of values. In some examples, these print coverage vectors may be determined randomly, in some cases with print agent limits. In other examples, they may be determined or selected in some other way. In some examples, the print coverage vector module 302 determines a plurality of print coverage vectors for each of a plurality of different common amounts of a the selected print agent.

The print output module 304 determines, for each print coverage vector, a colorimetry and a print characteristic. For example, this may be predicted theoretically, simulated (for example, via a halftoning operation, and in some examples modelling sources of perturbation such as drop placement error, drop weight variation, missing nozzles, substrate expansion and the like), or determined based on predetermined information such as previously printed and assessed sample prints.

The selection module 306 selects a print coverage vector from a set of print coverage vectors having the same colorimetry based on the print characteristic. The colorimetry may in some examples be determined to be the same if the colors lie in a common partition of color space, as described above. In some examples, the selection module may select the print coverage vector based on it exhibiting a favourable print characteristic.

The color mapping resource manager 308 determines a color mapping resource for a print apparatus based on the selected print coverage vectors. In some examples, the color mapping resource manager 308 determines a color mapping resource comprising a selected print coverage vector and an interpolated print coverage vector. For example, these may be selected as described in relation to FIG. 2 above. The color mapping resource may for example map between the color space in which the colorimetries are determined and print coverage vectors, or between a print agent color space (e.g. CMYK) and print coverage vectors such as NPacs, Mvocs or print agent vectors.

Figure 4:
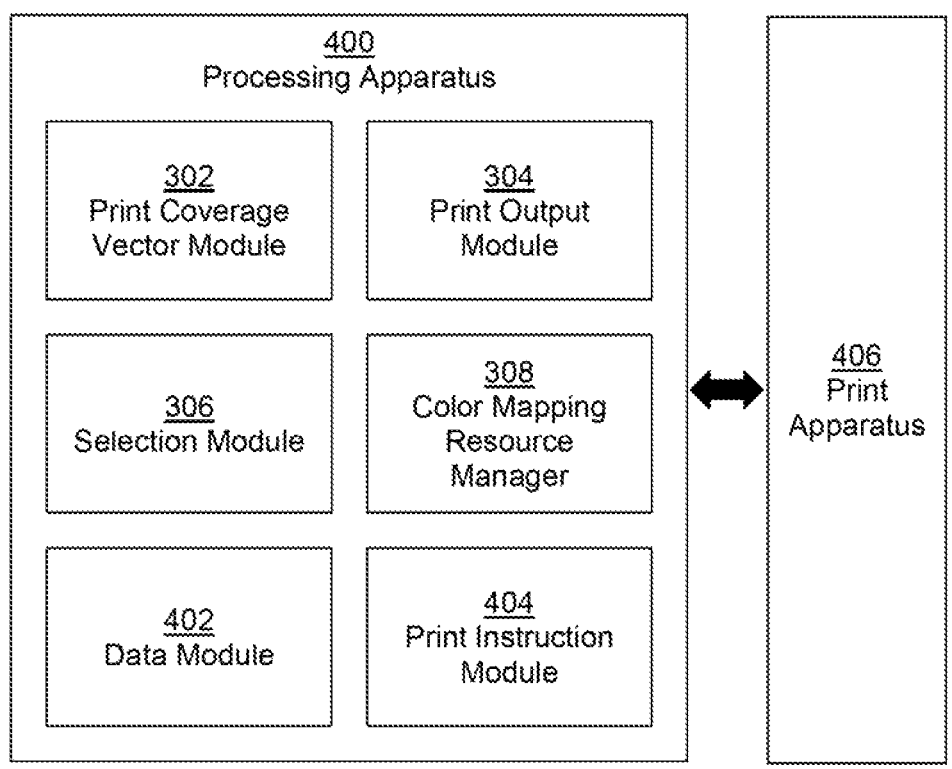

FIG. 4 shows an example of processing circuitry 400 comprising. In addition to the print coverage vector module 302, print output module 304, selection module 306 and color mapping resource manager 308, a data module 402 and a print instruction module 404. The processing circuitry 400 is associated with (and in some examples, a component of) a print apparatus 406.

The data module 402 acquires data representing an article to be printed. The article may for example comprise a substantially two dimensional image, for example a picture, pattern or text to be applied to a substrate such as paper, card or plastic. In other examples, the article may comprise an object to be printed using additive manufacturing techniques. The instructions may for example include a color description.

The print instruction module 404 determines print instructions based the acquired data and using the color mapping resource. For example, it may map between a color description and a print coverage vector. In some examples, the color mapping resource maps between a CMYK space and the print coverage vectors. In such an example, the K-level may be maintained when performing the mapping and a mapping to a print coverage vector having the colorimetry described and the K level specified may be selected. The actual print agent applied may be selected from the vector, for example using halftoning techniques or the like.

The print apparatus 406 prints an article according to print instructions. This may be a two dimensional or three dimensional article. To that end, the print apparatus 406 may comprise additional print apparatus components such as a print head, a print agent supply, and the like. Where the print apparatus 406 is a 'two dimensional' printer, it may comprise a laser printer or an inkjet printer or the like, and may comprise a print head, substrate handling systems, a source of ink or toner, and the like. Where the print apparatus 406 is a 'three dimensional' printer, it may comprise, or be associated with, a print bed, a fabrication chamber, a print head, an energy source, a source of build material, or the like.

In some examples, the processing circuitry 300, 400 may carry out at least some of the blocks of FIG. 1 and/or FIG. 2.

The processing circuitry 300,400, print coverage vector module 302, print output module 304, selection module 306, color mapping resource manager 308, data module 402 and/or a print instruction module 404 be implemented with one or a plurality of processors executing machine readable instructions stored in a memory, or a processor operating in accordance with instructions embedded in logic circuitry. It is noted that in at least one example described herein, the terms "module" and "manager" refers to a hardware component of the apparatus.

Figure 5:
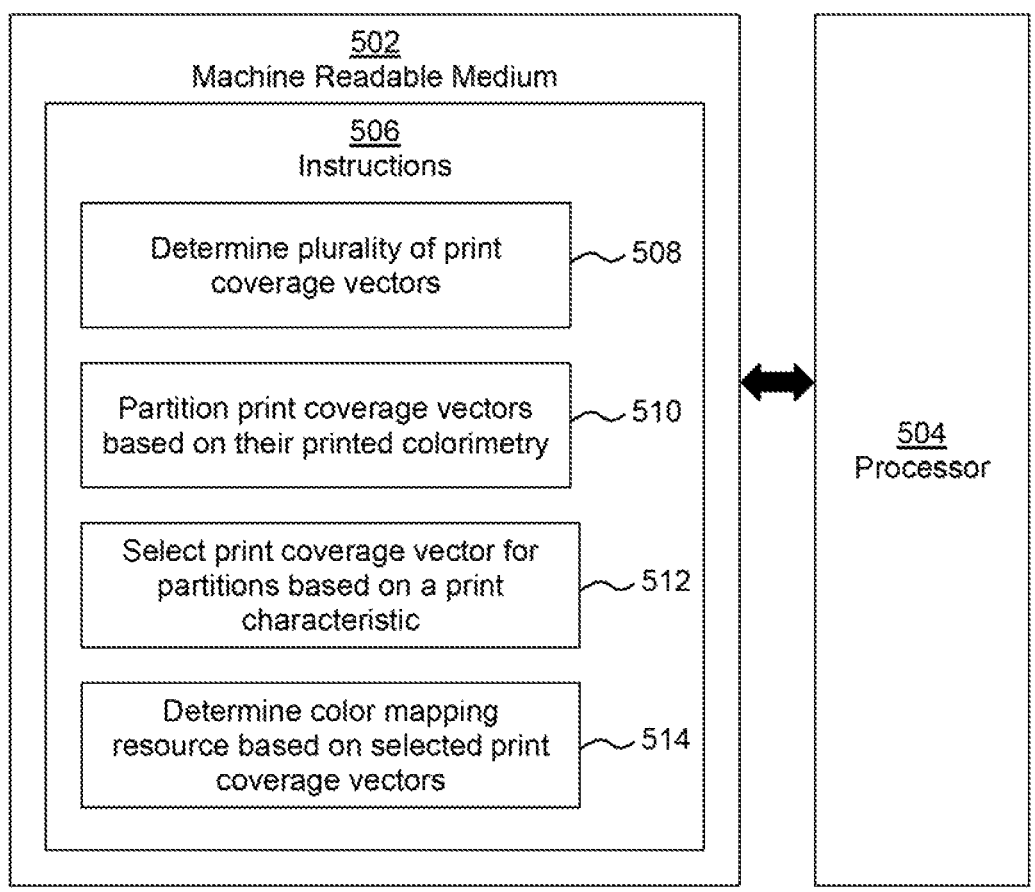
FIG. 5 is a block diagram of an example non-transitory machine readable medium associated with a processor.

FIG. 5 shows an example of a non-transitory machine-readable medium 502 in association with a processor 504. The machine-readable medium 502 has instructions 506 stored thereon. The instructions 506 when executed by the processor 504 cause the processor 504 to perform processing operations and comprise:

Instructions 506 to cause the processor 504 to, for a multi-channel color space comprising a black color channel, determine, for each of a plurality of print output black levels, a plurality of print coverage vectors. The black levels may be ranges. Each channel may comprise a color.

Instructions 510 to cause the processor 504 to partition the print coverage vectors based on their printed colorimetry.

Instructions 512 to cause the processor 504 to select, for each of a plurality of partitions, a print coverage vector based on a print characteristic. The print characteristic may in some examples be determined via simulation or modelling of a print output. The instructions 512 may comprise instructions to select a print coverage vector for each black level.

Instructions 514 to cause the processor 504 to determine a color mapping resource based on the selected print coverage vectors. In some examples, the color mapping resource may comprise interpolated print coverage vectors.

Examples in the present disclosure can be provided as methods, systems or as a combination of machine readable instructions and processing circuitry. Such machine readable instructions may be included on a non-transitory machine (for example, computer) readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry, or a module thereof, may execute the machine readable instructions. Thus functional modules of the processing circuitry 300,400 (for example, the print coverage vector module 302, print output module 304, selection module 306, color mapping resource manager, data module 402 and print instruction module 404) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that many implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   determining a plurality of print coverage vectors, each of the print coverage vectors specifying a common amount of a selected print agent;
   determining a colorimetry provided by each of the print coverage vectors;
   dividing a range of colorimetries into partitions in a calorimetric space;
   for each of a plurality of the partitions, determining a characteristic of each print coverage vector resulting in a colorimetry within that partition and selecting a print coverage vector for that partition based on the determination; and
   determining a color mapping resource for a print apparatus based on the selected print coverage vectors.

2. A method according to claim 1 further comprising repeating at, least part of the method for each of a plurality of different amounts of the selected print agent.

3. A method according to claim 2 wherein determining the color mapping resource comprises determining, for each partition of the colorimetric space, a set comprising ail selected print coverage vectors; and
   determining print coverage vectors specifying the lowest amount and the highest amount of the selected print agent.

4. A method according to claim 3 wherein determining print coverage vectors specifying a lowest amount of the selected print agent and the highest amount of the selected print agent comprises identifying the print coverage vectors from the set of print coverage vectors.

5. A method according to claim 3 wherein determining print coverage vectors specifying a lowest amount of the selected print agent and the highest amount of the selected print agent comprises interpolating new print coverage vectors from the set of print coverage vectors.

6. A method according to claim 3 further comprising deriving, by interpolation, intermediate print coverage vectors specifying amounts of the selected print agent which are intermediate to the highest and lowest amounts.

7. A method according to claim 1 wherein the common amount of the selected, print agent is zero, and the print coverage vectors are generated so as to result in a total coverage with a value that is less than 100%.

8. A method according to claim 7 wherein print coverage vectors are generated so as to result in a range of total coverages, the range comprising, a plurality of values that are less than 100%.

9. A method according to claim 7 wherein determining the color mapping resource further comprises adding, to each selected print coverage vector, a coverage relating to the selected print agent, where the coverage specified for the selected print agent is a difference between the total coverage for that print coverage vector and 100%.

10. A method according to claim 1 wherein determining the color mapping resource comprises determining a color mapping, wherein the mapping is to preserve the amount of the selected print agent and the colorimetry of an input color.

11. Processing circuitry comprising:
    a print coverage vector module to determine a plurality of print coverage vectors each of the vectors specifying a common amount of a selected print agent;
    a print output module to determine, for each print coverage vector, a colorimetry and a print characteristic;
    a selection module to select a print coverage vector from a set of print coverage vectors having the same colorimetry based on the print characteristic; and
    a color mapping resource manager to determine a color mapping resource for a print apparatus based on the selected print coverage vectors.

12. Processing circuitry according to wherein the color mapping resource manager is to determine a color mapping resource comprising, a selected print coverage vector and an interpolated print coverage vector.

13. Processing circuitry according to claim 11 further comprising a data module to acquire data representing an article to be printed and a print instruction module to determine print instructions based the acquired data and using the color mapping resource.

14. Processing circuitry according to claim 13 further comprising print apparatus to print article according to the print instructions.

15. A non-transitory machine readable medium comprising instructions which, when executed by a processor, cause the processor to:
    for a multi-channel color space comprising a black color channel, determine, for each of a plurality of print output black levels, a plurality of print coverage vectors;
    partition the print coverage vectors based on their printed colorimetry;
    select for each of a plurality of partitions at each print output black level, a print coverage vector based on a print characteristic; and
    determine a color mapping resource based on the selected print coverage vectors.

* * * * *